United States Patent [19]

Eubanks

[11] Patent Number: 4,811,965

[45] Date of Patent: Mar. 14, 1989

[54] VEHICLE HITCH

[76] Inventor: Hubert M. Eubanks, R.F.D. 1, Box 154, Lafayette, Ala. 36862

[21] Appl. No.: 76,347

[22] Filed: Jul. 22, 1987

[51] Int. Cl.⁴ .............................................. B60D 1/22
[52] U.S. Cl. ................................... 280/455.1; 280/477; 280/485; 280/489; 280/492; 280/508
[58] Field of Search ........... 280/484, 485, 489, 490 R, 280/492, 494, 474, 477, 508, 432, 446 B, 478 R, 478 A, 478 B; 172/275

[56] References Cited

U.S. PATENT DOCUMENTS

| 1,610,902 | 12/1926 | Tomilson | 280/494 X |
|---|---|---|---|
| 1,908,711 | 5/1933 | Kuchar | 280/484 |
| 2,027,046 | 1/1936 | Kuchar | 280/489 X |
| 2,234,163 | 3/1944 | Gurney et al. | 280/489 |
| 2,329,380 | 9/1943 | Arehart | 280/489 X |
| 4,560,184 | 12/1985 | Williams, Jr. | 280/477 X |

FOREIGN PATENT DOCUMENTS

| 2460796 | 3/1981 | France | 280/489 |
|---|---|---|---|
| 302391 | 12/1928 | United Kingdom | 280/489 |

Primary Examiner—David M. Mitchell
Assistant Examiner—Charles R. Watts
Attorney, Agent, or Firm—William R. Hinds

[57] ABSTRACT

A vehicle hitch for automatically connecting a vehicle to a trailer or connecting two vehicles for pushing or pulling one or the other. The hitch includes a coupling member mounted for pivotal movement in generally horizontal and vertical planes and provided with a shock absorber for cushioning certain forces and movements. An attachement pin has a cam surface to permit automatic coupling and can be locked in a disconnect position to simplify decoupling of the vehicle.

12 Claims, 3 Drawing Sheets

VEHICLE HITCH

FIELD OF THE INVENTION

The present inention relates to a vehicle hitch and, more particularly, to a vehicle hitch for connecting, preferably automatically, a vehicle such as a small pickup truck, automobile or tractor to a trailer or for connecting two vehicles together for pushing or pulling one or the other.

BACKGROUND

Proposals have been made over the years to provide a suitable hitch for facilitating connecting vehicles, or a vehicle with a trailer, and such proposed hitches are exemplified by U.S. Pat. Nos. 827,431 (Evensen), 1,384,944 (Flood), 2,556,748 (Buckley), 2,671,673 (Benson) and 3,891,237 (Allen). Generally speaking, these patents establish that self-coupling hitches of various designs are known in the art. The hitches typically include lead-in arrangements in the form of a funnel or bell-shaped mouth or tapering guide for automatically connecting, for example, the tongue on a trailer with the hitch carried by a towing vehicle. It is generally known to have a trailer tongue exert a camming action on spring-loaded pins or pawls, and it is also known to provide for relative swiveling or pivoting of the respective connecting members.

FEATURES, ASPECTS AND OBJECTS OF THE INVENTION

The vehicle hitch is essentially comprised of two major elements, namely, a support member for attaching the hitch to a vehicle (or trailer) and a coupling member, the support member carrying the coupling member which is typically connected thereto for swiveling in generally vertical and horizontal planes to facilitate automatically connecting the vehicles together and also providing for relative motion when the vehicles are maneuvering or traveling over uneven terrain or the like.

It is an object of the invention to provide a vehicle hitch of simplified but robust and reliable construction which is useful for automatically connecting two vehicles together by allowing relative motion therebetween during a connecting operation and also providing for relative motion during movement of the vehicles.

Another object of the invention is to provide such a vehicle hitch with a shock absorber for cushioning or damping certain forces and movements during the connecting operation or during movement of the vehicles.

Another object of the invention is to provide such a vehicle hitch wherein the coupling member is pivotally connected to the support member and an adjustable brake or friction member is provided for controlling movement therebetween and for providing a preferential wear surface. By appropriate adjustment of the brake or friction member, sway or yaw of the trailer or other towed vehicle can be reduced or even eliminated, thus avoiding the need for sway bars or other sway controls which typically have been used to dampen trailer yaw (sway) tendency.

Other objects, features, aspects and advantages of the invention will become readily apparent to those skilled in the art after consideration is given to the accompanying drawings, the following detailed description and the claimed subject matter.

DESCRIPTION OF THE PREFERRED EMBODIMENT

Figure 1:
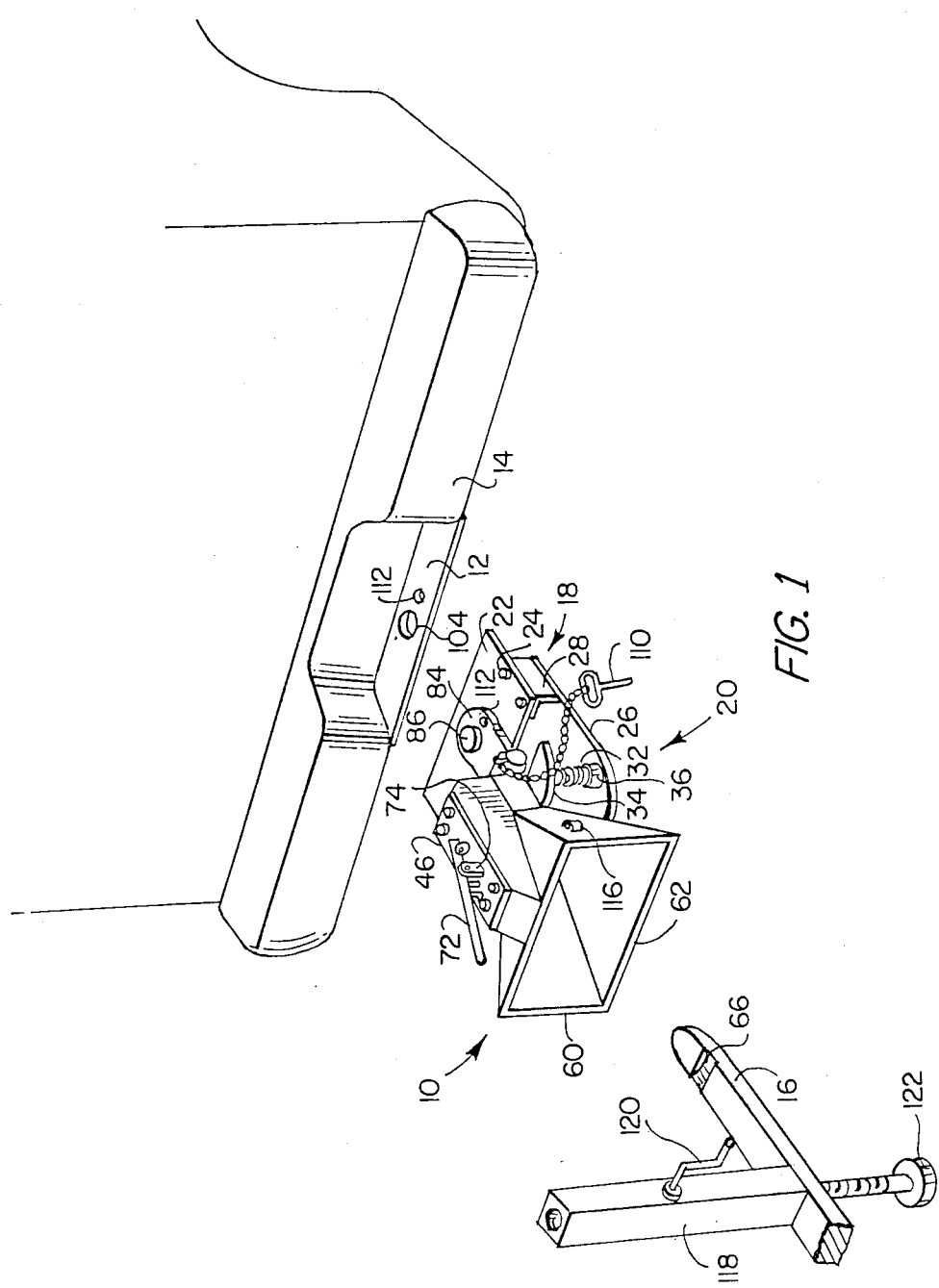
FIG. 1 is a perspective view of a vehicle hitch located for being mounted to a vehicle and connected with a trailer tongue.

Referring to the drawings in detail, a vehicle hitch, generally indicated by the numeral 10, is shown as being connectable to, for example, a step portion 12 of a vehicle bumper 14 and a connecting member or tongue 16 which forms part of a trailer or other vehicle.

Hitch 10 is comprised of a support member, generally indicated by the numeral 18, which is used to connect hitch 10 to the step portion 12 and supports a coupling member, generally indicated by the numeral 20.

Figure 2:
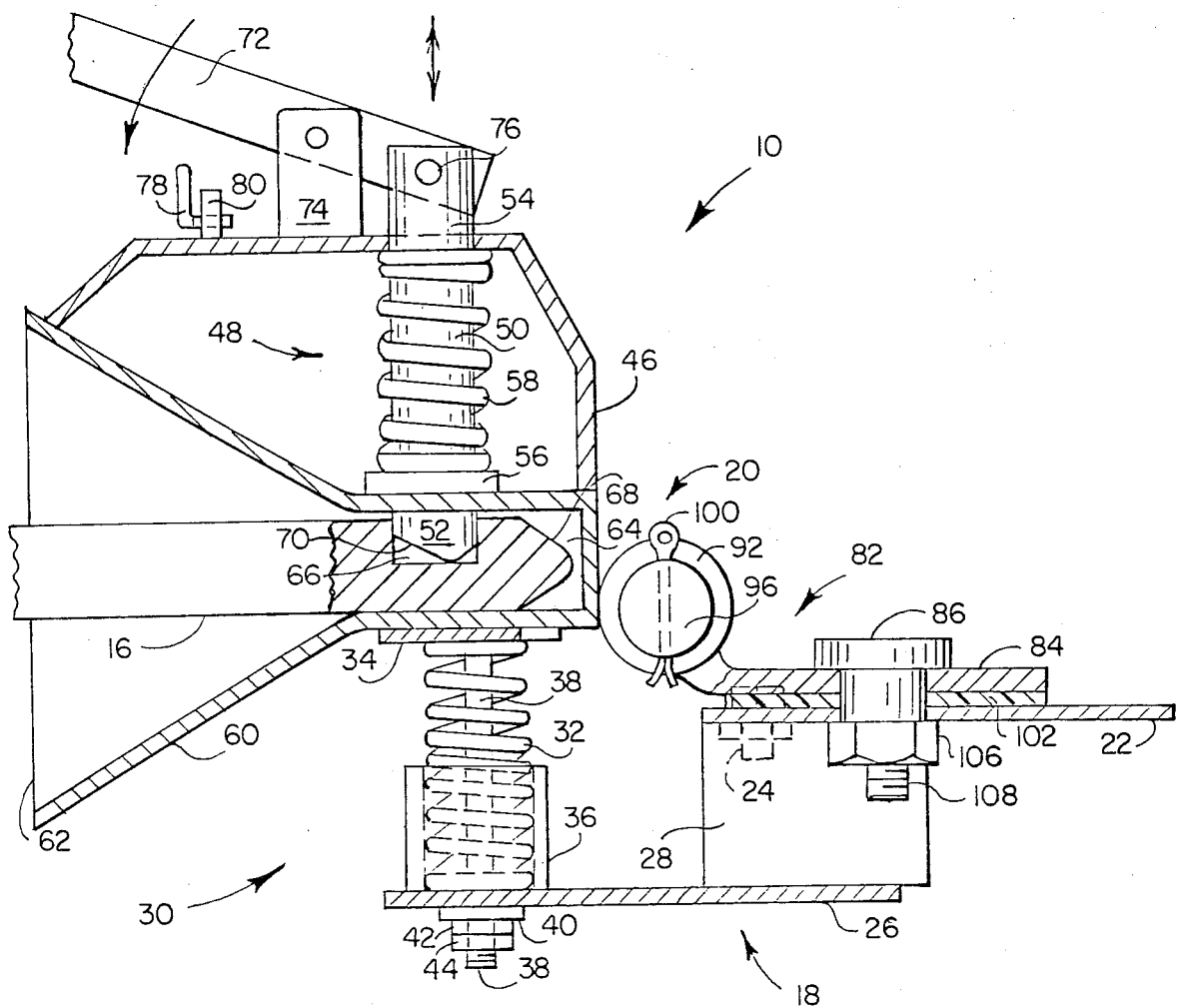
FIG. 2 is a vertical partially sectional view taken generally along a longitudinal center line of the vehicle hitch with some parts being broken away or shown in fragmentary position, and showing the trailer tongue in connected position.

Support member 18 includes a support plate 22 which is, preferably, secured to the underside of step portion 12 by a plurality of threaded fasteners 24 (cooperating with corresponding holes, not shown, in step portion 12) and carries a support platform 26 which may be welded or otherwise secured in spaced relation thereto by a plurality of brackets 28. Support platform 26, of support member 18, carries a cushioning member or shock absorber, generally indicated by the numeral 30, which is preferably comprised of a plurality of helical compression springs 32 disposed in spaced relation on opposite sides of a longitudinal center line of hitch 10 and resiliently supporting a slide plate 34 in spaced relation above support platform 26. As is best shown in FIGS. 1 and 2, springs 32 are each retained in proper location by being seated in a retaining cup 36 which is secured to support platform 26 and by a keeper bolt 38 which is welded or suitably secured to slide plate 34 and extends axially of the springs 32 and loosely through openings (not shown) in the support platform 26. The lowermost portions of keeper bolts 38 are each provided with a washer 40, an adjustment nut 42 and a locking nut 44 which are used to provide the spaced springs 32 with a matched or balanced resiliency. Downward forces on slide plate 34 will compress either or both of springs 32 and provide a smoother functioning of hitch 10. Spring loaded slide plate 34 also functions as an adjustable resilient level support for the coupling member in that the normal vertical support level of slide plate 34 can be varied by adjusting nuts 42 and 44 and washers 40 along keeper bolts 38 to adjust the vertical orientation of the coupling member.

Coupling member 20 includes a housing 46 for containing therein an attachment member, generally indicated by the numeral 48, and includes a generally vertically disposed attachment pin 50 having a lower end 52 extending below the housing 46 and an upper end extending outwardly above housing 46. As is best shown in FIG. 2, a keeper 56 is welded or otherwise suitable secured to attachment pin 50 for cooperating with a helical compression spring 58 which encircles pin 50.

Coupling member 20 includes a funnel-shaped coupling guide 60 having an enlarged open end 62 and converges to provide a reduced pocket 64 for receiving tongue 16 therein. A locking slot 66 is provided in tongue 16 for cooperating with the lower end 52 of attachment pin 50 for coupling the tongue 16 to the hitch 10. As is best shown in FIG. 2, a forward end 68 of tongue 16 is generally tapered or rounded to cooperate with beveled cam surface 70 on lower end 52 of attachment pin 50 so that during introduction of tongue 16 into coupling member 20, attachment pin 50 is forced upwardly until the locking slot 66 is properly located and allows compression spring 58 to move attachment pin 50 into operative engagement for locking tongue 16 within pocket 64.

A lever 72 is pivotally mounted on the upper side of housing 46 by a pair of brackets 74 and has one end thereof pivotally connected by a pin 76 to the upper end 54 of attachment pin 50. Downward pressure on the free end of lever 72 results in raising attachment pin 50 and retracting lower end 52 from within locking slot 66 on tongue 16. Lever 72 may be secured in a lowermost position by a C-shaped latch member 78 pivotally supported in an upstanding bracket 80 secured on a top portion of housing 46. This arrangement allows for an operator to retract attachment pin 50, retain it in an unlocked position and then simply separate the vehicles by driving away.

Figure 3:
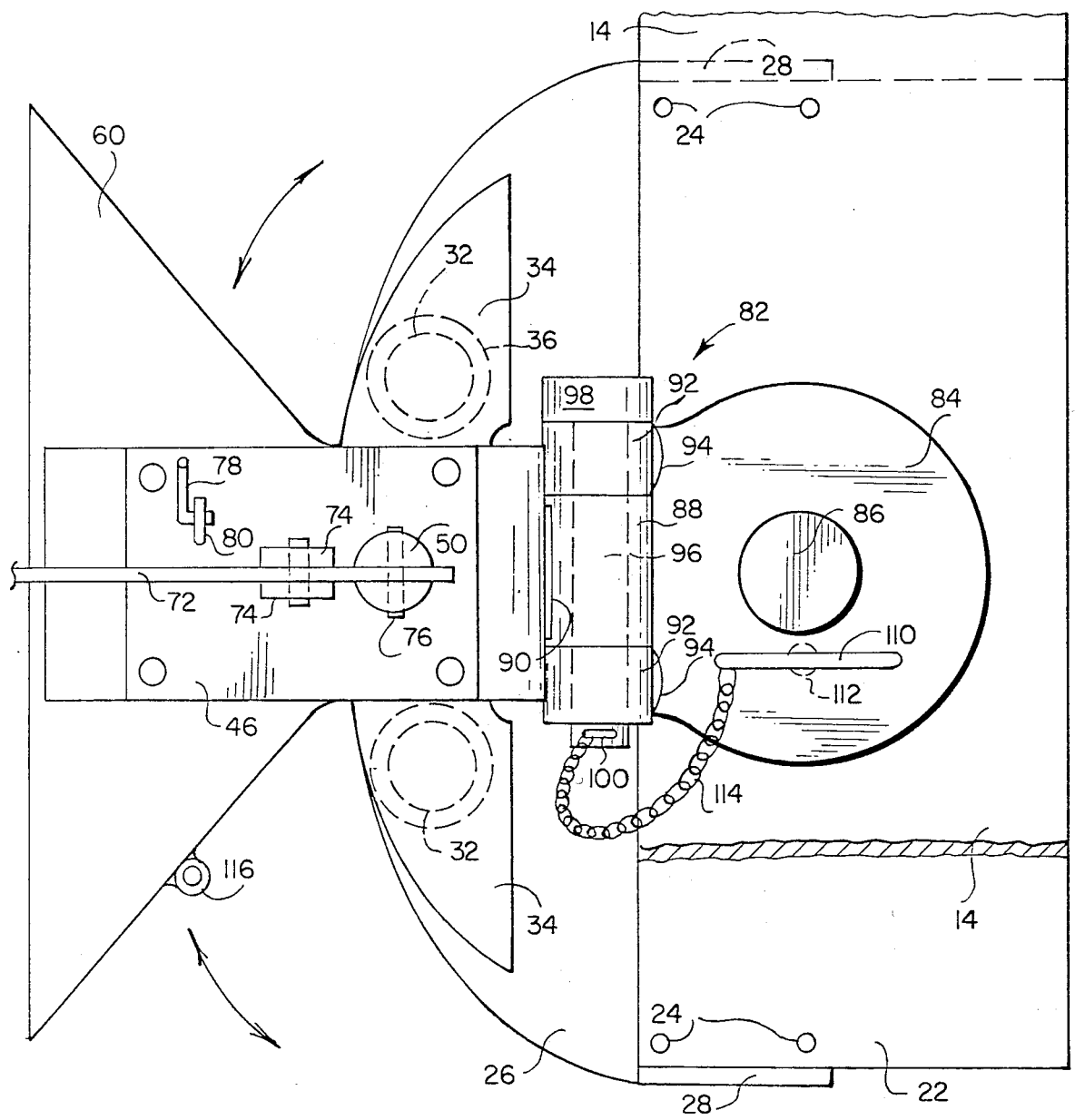
FIG. 3 is a plan view and illustrates horizontal movement of the coupling member with respect to the support member.

Coupling member 20 is connected to support member 18, and hence in use to bumper step 12, for rotation in generally horizontal and vertical planes by a fastener, generally indicaetd by the numeral 82, comprised of a hasp plate 84 which is rotatively supported by a vertically disposed pivot pin 86. A circular boss or eyelet 88 is attached to coupling member 20 by a weld bead 90 (FIG. 3) and cooperates with a pair of cylindrical bosses or eyelets 92, affixed to hasp plate 84 by weld beads 94 (FIG. 3), all in alignment with each other for cooperating with a horizontally disposed pivot pin 96. Pivot pin 96 is contained within the bosses 88 and 92 by having a head 98 secured at one end thereof and a conventional cotter pin 100 passing through the other end thereof. Thus, the fastener 82 connects the coupling member 20 to support member 18, and hence in use to bumper step 12, so that it swivels or rotates in a generally horizontal plane about pivot pin 86 and swivels or rotates in a generally vertical plane about horizontally disposed pivot pin 96. As shown in FIG. 2, the coupling member slidably rests on and is vertically supported by resiliently mounted slide plate 34 throughout the horizontal arc of movement of the coupling member, and either sliding surface may be formed with an appropriate bearing material if desired.

While it is desirable and necessary for coupling member 20 to swivel in a horizontal plane about pivot pin 86, unrestricted swiveling should be restrained. Accordingly, hitch 10 is provided with a brake or friction pad 102 in contact with the underside of hasp plate 84. As previously described, support plate 22 is preferably secured to the underside of the vehicle step portion 12. The brake or friction pad 102 is then located on the top of step portion 12 to encircle a mounting hole 104 which is formed in bumper 14. The vertically disposed pivot pin 86 is then passed through the hasp plate 84, brake or friction pad 102, mounting hole 104, support plate 22 and secured by an adjustment nut 106 which is screwed onto a threaded lower end portion 108 of pivot pin 96. As a result, horizontal swiveling of coupling member 20 is adjustably controlled by compressing brake or friction pad 102 between hasp plate 84 and the step portion 12 of bumper 14. By appropriate adjustment, sway or yaw of the trailer can be dampened and reduced and controlled or even eliminated. Thus, the hitch of this invention can avoid the need for sway bars or other sway controls which typically have been needed and used to dampen trailer sway or yaw tendency, sometimes called "whipping." Pad 102, which can be made of typical brake lining or pad material, also constitutes a preferential wear member to minimize wear on step portion 12 and hasp 84.

When hitch 10 is not in use, coupling member 20 is locked in position and swinging in a horizontal plane is positively precluded by the provision of a lock pin 110 being inserted in a locking hole 112, locking hole 112 passing through hasp plate 84, friction pad 102, step portion 12 and support plate 22. In order to keep lock pin 110 from being lost or misplaced, a link chain 114 is used to attach it to cotter pin 100. During operation, lock pin 110 is removed from locking hole 112 and retained in a holder 116 located on the funnel-shaped coupling guide 60.

One manner of operation of hitch 10 will now be described in conjunction with the showing in FIG. 1 wherein tongue 16 may be part of a boat trailer or the like. An operator positions the vertical elevation of tongue 16 through, for example, an adjustable screw or ratchet jack 118 having an adjustment crank 120 for positioning a foot or base 122. Hitch 10 may then be connected with tongue 16 by backing the vehicle causing coupling guide 60 to receive tongue 16 therein. Horizontal and vertical swiveling of coupling member 20 if necessary, in conjunction with the funnel-shape of coupling guide 60, will cause tongue 16 to be received within pocket 64 and be secured therein by the lower end 52 of attachment pin 50. Locking slot 66, in tongue 16, is preferably provided with an upwardly concave curvature to facilitate relative sliding motion between attachment pin 50 and tongue 16 during relative motion about the longitudinal axis of tongue 16 caused by uneven terrain during movement of the vehicles. Hitch 10 is readily disconnected from tongue 16 by rotating lever 72 counterclockwise, as shown in FIG. 2, and the rotation of C-shaped lock member 78 upwardly and over lever 72 for holding attachment pin 50 in its retracted position. When not in use, the entire hitch may be dismounted from the vehicle. Alternatively, the support 18 may remain mounted, and the coupling member 20 may be removed by removing pin 96 and disconnecting the coupling member from hasp plate 84.

While the invention has been particularly described for use and operation in conjunction with the tongue of a boat trailer or the like, it is to be understood that hitch 10 is readily adaptable for use with, for example, luggage trailers at airports, etc., and wherever speed of coupling and uncoupling of vehicles is necesssary or desirable. Also, it is to be understood that tongue 16 may be attached to a second vehicle and hitch 10 may be utilized to connect the vehicles together for either towing or pushing thereof. While specific features and structure have been shown in illustrating the invention, it is to be understood that those skilled in the art may make various modifications and changes without departing from the spirit or scope of the invention as particularly defined by the following claimed subject matter.

I claim:

1. A hitch for connecting a first vehicle to a second vehicle, said hitch comprising a support member, means for securing said support member to one of said vehicles, a coupling member for receiving a coupling tongue which is connected to the other vehicle, said hitch including first pivot means operatively coupling said support member and said coupling member for providing movement of said coupling member in a generally horizontal plane and second pivot means for providing movement of said coupling member in a generally vertical plane, attachment means for attaching said coupling tongue to said coupling member, and shock absorber means operatively disposed between said coupling member and said support member for absorbing shock during movement of said coupling member relative to said support member, said first pivot means including variable friction means for variably resisting movement of said coupling member in said generally horizontal plane, and manually adjustable means for adjustably varying the movement resistance of said friction means so as to reduce and damp sway or yaw tendency of a towed vehicle.

2. A hitch as defined in claim 1 wherein said shock absorber means comprise cushioning means, mounting means mounting said cushioning means between said coupling member and said support member for dampening movement of said coupling member about said second pivot means.

3. A hitch as defined in claim 2 wherein said cushioning means comprise a pair of helical compression springs, said mounting means mounting said springs in spaced relation to each other between said coupling member and said support member, said springs having longitudinal axes thereof disposed generally vertical between said support member and said coupling member.

4. A hitch as defined in claim 3 including a slide plate extending generally horizontally between and resiliently supported by said springs and in turn supporting said coupling member, and keeper means for retaining said slide plate and said springs on said support member.

5. A hitch as defined in claim 1 wherein said coupling member includes a funnel-shaped guide means for facilitating alignment and engagement of said coupling member with said coupling tongue, and said attachment means includes an attachment member carried by said coupling member and including an attachment pin, means for biasing said attachment pin toward an operative attachment position, lever means for retracting said attachment pin from said operative position to a retracted position, and lock means for holding said attachment pin in said retracted position.

6. A hitch as claimed in claim 1 wherein said variable friction means includes a friction pad bearing against a member which moves horizontally with said coupling member, and said manually adjustable means comprises threaded bolt means for variably pressing said friction pad against said member which moves horizontally with said coupling member.

7. A hitch as claimed in claim 6 wherein said threaded bolt means forms the pivot axis of said first pivot means, and said friction pad is disposed about said threaded bolt.

8. A hitch for connecting a first vehicle to a second vehicle, said hitch comprising a support member and a coupling member, first means for securing said support member to one of said vehicles and second means for securing said coupling memeber to the other of said vehicles, and fastener means for connecting said coupling member to said support member, said fastener means comprising a hasp plate, first pivot means connecting said hasp plate to said support member for providing generally horizontal relative movement therebetween, second pivot means connecting said hasp plate to said coupling member for providing generally vertical relative movement therebetween, and shock absorber means disposed between said support member and said coupling member for absorbing shock during vertical movement of said coupling member about said second pivot means.

9. A hitch as defined in claim 8 including a friction pad disposed between said hasp plate and said support member, and adjustable means for compressing said hasp plate against said friction pad for restricting horizontal relative movement of hasp plate about said first pivot means.

10. A hitch for connecting a towed vehicle to a towing vehicle, said hitch comprising a support member, means for securing said support member to one of said vehicles, a coupling member for receiving a coupling tongue which is connected to the other vehicle; fastener means for connecting said coupling member to said support member, said fastener means comprising a hasp plate, first pivot means connecting said hasp plate to said support member for providing generally horizontal relative movement therebetween, and second pivot means connecting said hasp plate to said coupling member for providing generally vertical relative movement therebetween; shock absorber means operatively disposed between said coupling member and said support member for absorbing shock during said generally vertical movement of said coupling member about said second pivot means relative to said support member, said shock absorber means comprising a pair of helical compression springs, means mounting said springs in spaced relation to each other and having longitudinal axes of said springs disposed generally vertical between said coupling member and said support member, a slide plate extending generally horizontally between and resiliently supported by said springs, and keeper means for retaining said slide plate and said springs on said support member; said coupling member including a funnel-shaped guide means for facilitating alignment of said coupling member with said coupling tongue, an attachment pin carried by said coupling member, means for biasing said attachment pin toward an operative position for contact with said coupling tongue, lever means for retracting said attachment pin from said operative position to a retracted position, and lock means for holding said attachment pin in said retracted position.

11. A hitch as defined in Claim 10 including a friction pad disposed between said haps plate and said support member, said first pivot means including adjustable means for variably compressing said hasp plate against said friction pad for controlling said generally horizontal relative movement between said hasp plate and said support member.

12. A hitch for connecting a first vehicle to a second vehicle, said hitch comprising a support member, means for securing said support member to one of said vehicles, a coupling member for receiving a coupling tongue which is connected to the other vehicle, said hitch including first pivot means for providing movement of said coupling member in a generally horizontal plane and second pivot means for providing movement of said coupling member in a generally vertical plane, attachment means for attaching said coupling tongue to said coupling member, and shock absorber means operatively disposed between said coupling member and said support member for absorbing shock during movement of said coupling member relative to said support member, said shock absorber means comprising a pair of helical compression springs, mounting means mounting said springs in spaced relation to each other between said coupling member and said support member for dampening movement of said coupling member about said second pivot means, said springs having longitudinal axes thereof disposed generally vertically between said support member and said coupling member, a slide plate extending generally horizontally between and resiliently supported by said springs and in turn supporting said coupling member, and keeper means for retaining said slide plate and said springs on said support member.

* * * * *